United States Patent
Huang et al.

(10) Patent No.: US 8,644,395 B2
(45) Date of Patent: Feb. 4, 2014

(54) METHOD FOR TEMPORAL ERROR CONCEALMENT

(75) Inventors: Shih-Chia Huang, Taipei (TW); Sy-Yen Kuo, Taipei (TW)

(73) Assignee: Acer Incorporated, Taipei Hsien (TW)

( * ) Notice: Subject to any disclaimer, the term of this patent is extended or adjusted under 35 U.S.C. 154(b) by 507 days.

(21) Appl. No.: 12/629,418

(22) Filed: Dec. 2, 2009

(65) Prior Publication Data
US 2010/0322314 A1  Dec. 23, 2010

(30) Foreign Application Priority Data
Jun. 23, 2009 (TW) .............................. 98121020 A

(51) Int. Cl.
  *H04N 7/68* (2006.01)
  *H04N 7/50* (2006.01)
  *H04N 7/34* (2006.01)
  *H04N 7/36* (2006.01)
(52) U.S. Cl.
  USPC ................................ 375/240.29; 375/240.27
(58) Field of Classification Search
  USPC ........................................ 375/240.27, 240.29
  See application file for complete search history.

(56) References Cited

U.S. PATENT DOCUMENTS

| | | | | |
|---|---|---|---|---|
| 5,737,022 | A * | 4/1998 | Yamaguchi et al. ...... | 375/240.15 |
| 6,590,934 | B1 * | 7/2003 | Kim .............. | 375/240 |
| 6,754,278 | B1 * | 6/2004 | Suh et al. ............. | 375/240.27 |
| 7,294,925 | B2 * | 11/2007 | Choi et al. .............. | 257/710 |
| 7,782,954 | B2 * | 8/2010 | Liang et al. ............. | 375/240.18 |
| 2003/0219073 | A1 * | 11/2003 | Lee et al. ............. | 375/240.27 |
| 2005/0129125 | A1 * | 6/2005 | Cha et al. ............. | 375/240.16 |
| 2005/0220190 | A1 * | 10/2005 | Ha et al. ............. | 375/240.16 |
| 2006/0171473 | A1 * | 8/2006 | Schoner ............. | 375/240.27 |
| 2007/0058718 | A1 * | 3/2007 | Shen et al. ............. | 375/240.12 |
| 2008/0158417 | A1 * | 7/2008 | Living ............. | 348/452 |
| 2008/0279283 | A1 * | 11/2008 | Weinstock et al. ...... | 375/240.24 |

OTHER PUBLICATIONS

J.W. Suh & Y.S. Ho, "Error Concealment based on Directional Interpolation", 43 IEEE Trans. on Consumer Electronics 295-302 (Aug. 1997).*
S.C. Huang & S.Y. Kuo, "Optimization of Hybridized Error Concealment for H.264", 54 IEEE Trans. on Broadcasting 499-516 (Sep. 2008).*
K.C. Hou, M.J. Chen & C.T. Hsu, "Fast Motion Estimation by Motion Vector Merging Procedure for H.264", 2005 IEEE Int'l Conf. on Multimedia and Expo (ICME 2005) 1444-1447 (Jul. 6, 2005).*
G.J. Sullivan & R.L. Baker, "Rate-Distortion Optimized Motion Compensation for Video Compression Using Fixed or Variable Size Blocks", 1 1991 Global Telecom. Conf. (GLOBECOM '91) 85-90 (1991).*
J. Zhai, K. Yu, J. Li, & S. Li, "A low complexity motion compensated frame interpolation method", 5 2005 IEEE Int'l Conf. on Circuits & Sys. (ISCAS 2005) 4927-4930 (May 2005).*

(Continued)

*Primary Examiner* — Dave Czekaj
*Assistant Examiner* — David N Werner
(74) *Attorney, Agent, or Firm* — Snell & Wilmer LLP

(57) ABSTRACT

A method for performing temporal error concealment is provided. The method includes the following steps: detecting a damaged macroblock having four 8×8 damaged blocks; obtaining motion vectors of a plurality of 4×4 neighboring blocks surrounding the damaged macroblock; and for each of the 8×8 damaged blocks, determining a predicted motion vector according to motion vectors of six of the plurality of 4×4 neighboring blocks which are closest to the 8×8 damaged block.

13 Claims, 9 Drawing Sheets

(56) References Cited

OTHER PUBLICATIONS

H.Y. Luo, Z.L. Gan, & X.C. Zhu, "Content-Adaptive Interpolation for Spatial Error Concealment", 1 2d Int'l Conf. on Info. & Comp. Sci. (ICIC '09) 265-268 (May 2009).*
M.J. Chen, L.G. Chen, & R.M. Weng, "Error Concealment of Lost Motion Vectors with Overlapped Motion Compensation", 7 IEEE Trans. on Circuits & Sys. for Video Tech. 560-563 (Jun. 1997).*
M.H. Chan, Y.B. Yu, & A.G. Constantinides, "Variable Size Block Matching Motion Compensation with Applications to Video Coding", 137 IEE Proc. of Communications, Speech & Vision 205-212 (Aug. 1990).*
Y. Nie & K.K. Ma, "Adaptive Rood Pattern Search for Fast Block-Matching Motion Estimation", 11 IEEE Transactions on Image Processing 1442-1449 (Dec. 2002).*
Z. Zhou, M.T. Sun, & Y.F. Hsu, "Fast Variable Block-Size Motion Estimation Algorithms Based on Merge and Split Procedures for H.264/MPEG-4 AVC", 3 Proc. of the 2004 Int'l Symposium on Cir. & Sys. (ISCAS '04) 725-728 (May 2004).*
Wang, Y., et al. "Error control and concealment for video communication: a review", Proc. IEEE, vol. 86, No. 5, pp. 974-997, May 1998.
Agrafiotis, D., et al. "Enhanced error concealment with mode selection", IEEE, Trans. Circuits Syst. Video Technology, vol. 16, No. 8, pp. 960-973, Aug. 2006.
Valente, S., et al. "An efficient error concealment implementation for MPEG-4 video streams", IEEE Trans. Consumer Electronics, vol. 47, No. 3, pp. 568-578, Aug. 2001.
Yan, B., et al. "A novel selective motion vector matching algorithm for error concealment in MPEG-4 video transmission over error-prone channels", IEEE Trans. Consumer Electronics, vol. 49, No. 4, pp. 1416-1423, Nov. 2003.
Zhang, J., et al. "A cell-loss concealment technique for MPEG-2 coded video", IEEE Trans. Circuits Syst. Video Technology, vol. 10, No. 4, pp. 659-665, Jun. 2000.
Pyun, J.Y., et al. "Robust error concealment for visual communications in burst-packet-loss networks", IEEE Trans. Consumer Electronics, vol. 49, No. 4, pp. 1013-1019, Nov. 2003.
Huang, S.C., et al. "Temporal error concealment for H.264 Using optimum regression plane", Proc. Int. Conf. MultiMedia Modeling (MMM), Jan. 2008, LNCS 4903, pp. 402-412.
Al-Mualla, M.E., et al. "Temporal error concealment using motion field interpolation", Electron. Lett., vol. 35, pp. 215-217, 1999.
Tsekeridou, S., et al. "Vector rational interpolation schemes for erroneous motion field estimation applied to MPEG-2 error concealment", IEEE Trans. Multimedia, vol. 6, No. 6, pp. 876-885, Dec. 2004.
Zheng, J., et al. "A motion vector recovery algorithm for digital video using Lagrange interpolation", IEEE Trans. Broadcast, vol. 49, No. 4, pp. 383-389, Dec. 2003.
Zheng, J., et al. "Error-concealment algorithm for H.26L using first-order plane estimation", IEEE Trans. Multimedia, vol. 6, No. 6, pp. 801-805, Dec. 2004.
Zheng, J., et al. "Efficient motion vector recovery algorithm for H.264 based on a polynomial model", IEEE Trans. Multimedia, vol. 7, No. 3, pp. 507-513, Jun. 2005.
Shirani, S., et al. "A concealment method for video communication in an error-prone environment", IEEE Journal on Selected Areas in Communication, vol. 18, pp. 1122-1128, Jun. 2000.
Lee, Y.C., et al. "Multiframe error concealment for MPEG-coded video delivery over error-prone networks", IEEE Trans. Image Process, vol. 11, No. 11, pp. 1314-1331, Nov. 2002.
Yu, G.S., et al. "POCS-based error concealment for packet video using multiframe overlap information", IEEE Trans. Circuits Syst. Video Technology, vol. 8, pp. 422-434, Aug. 1998.
Belfiore, S., et al. "Concealment of whole-frame losses for wireless low bit-rate video based on multiframe optical flow estimation", IEEE Trans. Multimedia, vol. 7, No. 2, pp. 316-329, Apr. 2005.
Baccichet, P., et al. "Frame concealment for H-264/AVC decoders", IEEE Trans. Consumer Electronics, vol. 51, No. 1, pp. 227-233, Feb. 2005.
Suh et al., "Error Concealment Based on Directional Interpolation," IEEE Transactions on Consumer Electronics, vol. 43, No. 3, Aug. 1997, pp. 295-302499-516.
Huang et al., "Optimization of Hybridized Error Concealment for H.264," IEEE Transactions on Broadcasting, vol. 54, No. 3, Sep. 2008, pp.
Office Action mailed Aug. 30, 2012 in counterpart Taiwanese Application No. 098121020.

* cited by examiner

METHOD FOR TEMPORAL ERROR CONCEALMENT

CROSS-REFERENCE TO RELATED APPLICATIONS

This application claims priority to Taiwan Patent Application No. 098121020 entitled "METHOD FOR TEMPORAL ERROR CONCEALMENT," filed on Jun. 23, 2009, which is incorporated herein by reference.

FIELD OF INVENTION

The present invention relates to a method for temporal error concealment, and more particularly to a method for temporal error concealment by predicting motion vectors of blocks within a damaged block based on the information of the spatially neighboring blocks, determining partition mode of the damaged block based on the predicted motion vectors, and performing the motion refinement process by partial distortion comparison.

BACKGROUND OF THE INVENTION

Since multimedia applications are becoming more and more popular, the video compression techniques are also becoming increasingly important. The main principle of these compression techniques is to eliminate redundancy among successive frames to reduce the storage requirement and the amount of transmission data. Intra prediction and inter prediction are two new coding techniques developed by H.264/AVC compression standard. The intra prediction technique utilizes the spatial correlation among neighboring blocks within one frame, while the inter prediction technique utilizes the temporal correlation among consecutive frames.

For the inter prediction, the H.264/AVC standard defines seven inter modes of different block sizes for a 16×16 macroblock: 16×16 (T1 mode), 16×8 (T2 mode), 8×16 (T3 mode), 8×8 (T4 mode), 8×4 (T5 mode), 4×8 (T6 mode), and 4×4 (T7 mode), as shown in FIG. 1. After coded, each block can be represented by residual value and motion vector thereof. The display quality can be improved by selecting the block of small size, but with the detriment of increased complexity and time demands. Therefore, considering both of the display quality and the coding efficiency, different block size is adopted according to the complexity of the display image so that high efficient video compression can be achieved.

After being compressed, the video data are transformed into video bitstreams which are suitable for transmission and storage. However, transmission of highly compressed video bitstreams can suffer from packet erasures (especially in regard to wireless video transmission). In order to avoid the degradation in quality of the received video frames caused by video packet erasures, three mechanisms are commonly used to guard against possible packet losses: automatic retransmission request (ARQ), forward error correction (FEC), and error concealment. Compared with the ARQ and FEC techniques, the error concealment techniques do not require additional bandwidth and are especially useful in multicast and broadcast situations. The error concealment techniques executed at the video decoder can be classified into two types: spatial error concealment and temporal error concealment. The spatial error concealment utilizes spatial redundancy information in a frame to recover the damaged video sequences, while the temporal error concealment exploits the high correlation among consecutive frames of the coded sequence to reconstruct the damaged video sequences. Since the high temporal correlation usually exists among consecutive frames, except for some specific situations (such as scene changes, or the appearance and disappearance of objects), the use of temporal error concealment can offer better video quality compared to the spatial error concealment.

Since the temporal error concealment approach conceals the damaged block by utilizing the reference frames in order to exploit temporal redundancy in a video sequence, the motion vector of the damaged block should be estimated at the start. Various simple methods for predicting the motion vector of the damaged block have been proposed, such as utilization of a zero motion vector, utilization of the average of the motion vectors from spatially neighboring blocks, utilization of the temporally corresponding motion vectors of corresponding blocks in the reference frames, etc. Additional information in this regard can be found in "Error control and concealment for video communication: a review" by Y. Wang et al., Proc. IEEE, vol. 86, no. 5, pp. 974-997, May 1998; "Enhanced error concealment with mode selection" by D. Agrafiotis et al., IEEE Trans. Circuits Syst. Video Technology, vol. 16, no. 8, pp. 960-973, August 2006; "An efficient error concealment implementation for MPEG-4 video streams" by S. Valente et al., IEEE Trans. Consumer Electronics, vol. 47, no. 3, pp. 568-578, August 2001; "A novel selective motion vector matching algorithm for error concealment in MPEG-4 video transmission over error-prone channels" by B. Yan et al., IEEE Trans. Consumer Electronics, vol. 49, no. 4, pp. 1416-1423, November 2003; "A cell-loss concealment technique for MPEG-2 coded video" by J. Zhang et al., IEEE Trans. Circuits Syst. Video Technol., vol. 10, no. 4, pp. 659-665, June 2000; "Robust error concealment for visual communications in burst-packet-loss networks" by J. Y. Pyun et al., IEEE Trans. Consum. Electron., vol. 49, no. 4, pp. 1013-1019, November 2003; and "Temporal Error Concealment for H.264 Using Optimum Regression Plane" by S. C. Huang et al., in Proc. Int. Conf. MultiMedia Modeling (MMM), January 2008, LNCS 4903, pp. 402-412, the entire contents of which being incorporated herein by reference.

Furthermore, other improvements for the temporal error concealment approach include "Temporal error concealment using motion field interpolation" by M. E. Al-Mualla et al, Electron. Lett., vol. 35, pp. 215-217, 1999; "Vector rational interpolation schemes for erroneous motion field estimation applied to MPEG-2 error concealment" by S. Tsekeridou et al., IEEE Trans. Multimedia, vol. 6, no. 6, pp. 876-885, December 2004; "A motion vector recovery algorithm for digital video using Lagrange interpolation" by J. Zheng et al., IEEE Trans. Broadcast., vol. 49, no. 4, pp. 383-389, December 2003; "Error-concealment algorithm for H.26L using first-order plane estimation" by J. Zheng et al., IEEE Trans. Multimedia, vol. 6, no. 6, pp. 801-805, December 2004; "Efficient motion vector recovery algorithm for H.264 based on a polynomial model" by J. Zheng et al., IEEE Trans. Multimedia, vol. 7, no. 3, pp. 507-513, June 2005; "A concealment method for video communications in an error-prone environment" by S. Shirani et al., IEEE Journal on Selected Areas in Communication, Vol. 18, pp. 1122-1128, June 2000; "Multiframe error concealment for MPEG-coded video delivery over error-prone networks" by Y. C. Lee et al., IEEE Trans. Image Process., vol. 11, no. 11, pp. 1314-1331, November 2002; "POCS-based error concealment for packet video using multiframe overlap information" by G. S. Yu et al, IEEE Trans. Circuits Syst. Video Technol., vol. 8, pp. 422-434, August 1998; "Concealment of whole-frame losses for wireless low bit-rate video based on multiframe optical flow estimation" by S. Belfiore et al., IEEE Trans. Multimedia, vol. 7, no. 2, pp. 316-329, April 2005; and "Frame concealment for H.264/AVC decoders" by P. Baccichet et al., IEEE Trans. Consumer Electronics, vol. 51, no. 1, pp. 227-233, February 2005, the entire contents of which being incorporated herein by reference.

Although many techniques for improving the temporal error concealment approach have been proposed, both of the prediction accuracy of the motion vector and the quality of concealment need to be further optimized.

SUMMARY OF THE INVENTION

In light of the problems of the prior art, the present invention provides a high-performance temporal error concealment method suitable for H.264/AVC video compression standard to effectively increase the prediction accuracy of the motion vector and the quality of error concealment.

According to one aspect of the present invention, a method for performing temporal error concealment is provided. The method includes the following steps: detecting a damaged macroblock having four 8×8 damaged blocks; obtaining motion vectors of a plurality of 4×4 neighboring blocks surrounding the damaged macroblock; and for each of the 8×8 damaged blocks, determining a predicted motion vector according to motion vectors of six of the plurality of 4×4 neighboring blocks which are closest to the 8×8 damaged block.

According to another aspect of the present invention, a computer readable medium is provided. The computer readable medium has a program code stored thereon, and when the program code is executed by a video decoding system, the program code causes the video decoding system to implement the above-mentioned method.

Other aspects of the present invention would be stated and easily understood through the following description or the embodiments of the present invention. The aspects of the present invention would be appreciated and implemented by the elements and their combinations pointed out in the appended claims. It should be understood that the above summary of the invention and the following detailed description are only illustrative but not to limited the present invention.

BRIEF DESCRIPTION OF THE DRAWINGS

The drawings are employed to illustrate the embodiments and the principles of the present invention in conjunction with the description. However, it should be understood that the present invention is not limited to the shown configurations and elements, in which.

DETAILED DESCRIPTION OF THE PREFERRED EMBODIMENTS

The objects, features and advantages of the present invention would be more apparent by referring to the following description of the preferred embodiments and FIGS. 2-9. However, the apparatuses, elements, and steps of the method described in the following embodiments are intended to illustrate the present invention, but not to limit the scope of the invention.

Figure 1:
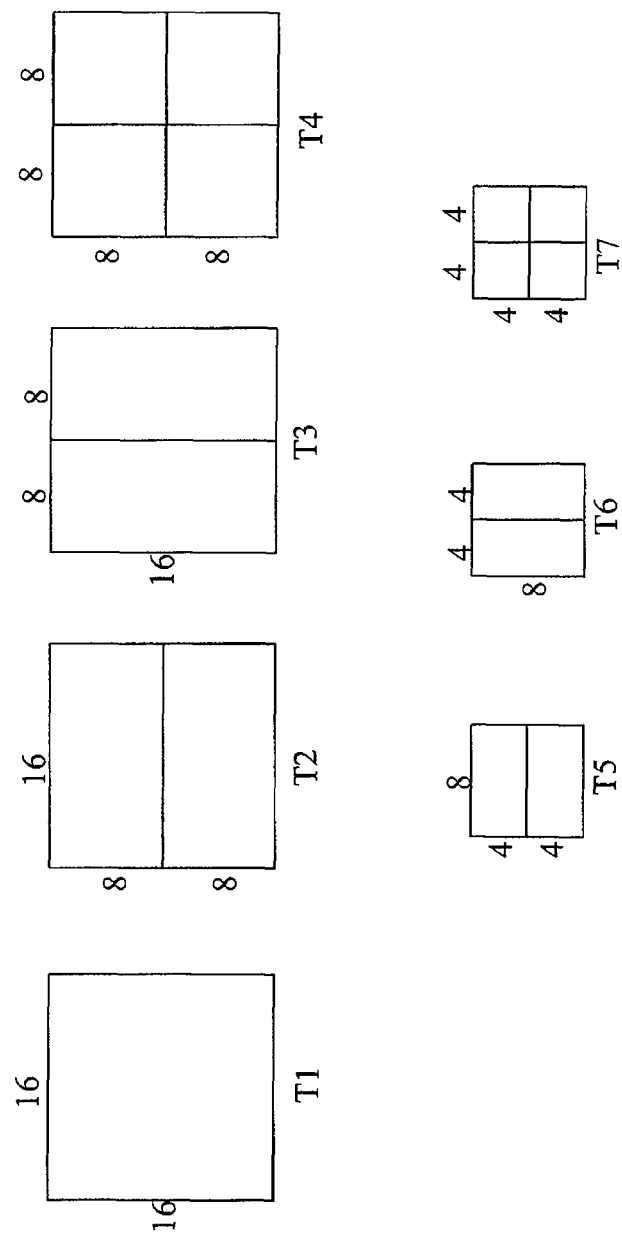
FIG. 1 illustrates partition modes of different block sizes for inter prediction defined in H.264 standard.
Figure 2:
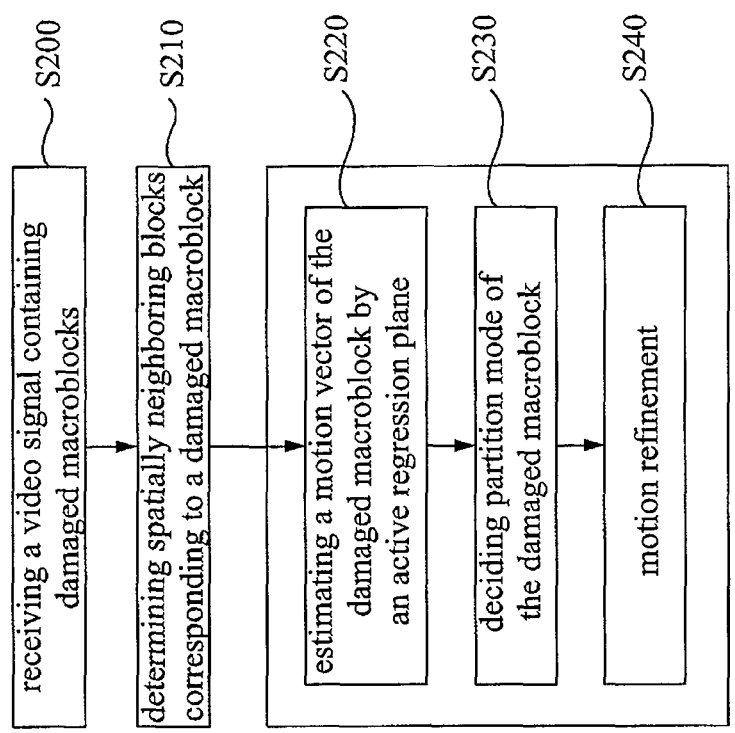
FIG. 2 is a flowchart showing a method for performing temporal error concealment in accordance with one embodiment of the present invention.

FIG. 2 is a flowchart showing a method for performing the temporal error concealment in accordance with one embodiment of the present invention. In step S200, a video signal, which is comprised of a plurality of frames, having at least one frame containing missing or damaged macroblocks is received and decoded. In step S210, the spatially neighboring blocks corresponding to a damaged macroblock are determined. Next, in step S220, a motion vector of the damaged macroblock is estimated by using an active regression plane developed according to the motion vectors of the neighboring blocks determined in step S210. In step S230, the most suitable partition mode of the damaged macroblock is decided based on the estimated motion vector of the damaged macroblock. Finally, in step S240, motion refinement is applied to the damaged macroblock by using variable block size motion compensation in order to make a refined estimate of the motion vector of the damaged macroblock. In addition, the present invention provides some early termination techniques for step S240 to reduce the time required to perform the refinement process and improve video fidelity. A more detailed description of steps S220 to S240 is presented below.

Figure 3:
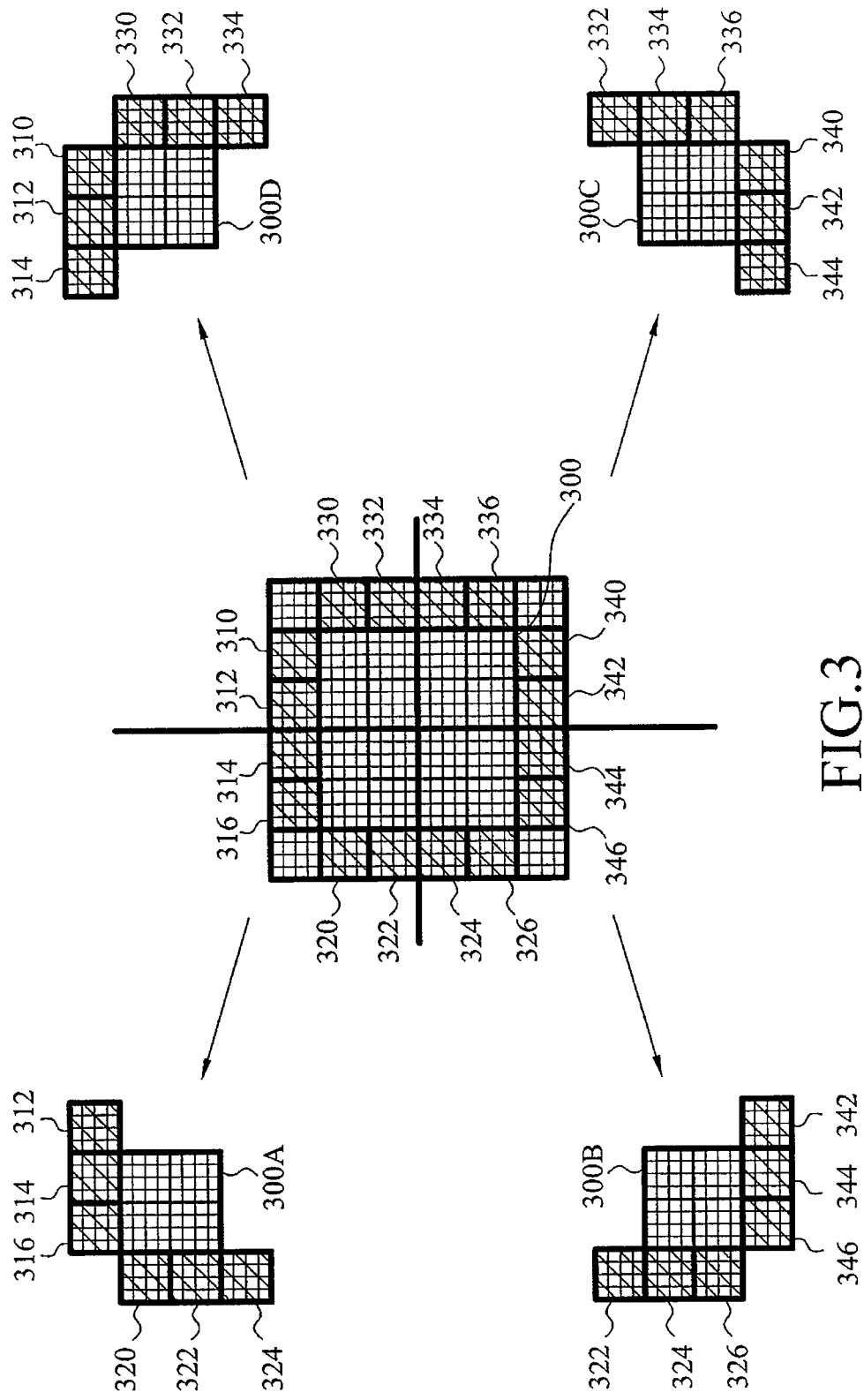
FIG. 3 illustrates a macroblock lost or damaged during transmission and its neighboring 4×4 blocks.

Referring to FIG. 3, the macroblock (MB) 300 is a 16×16 macroblock lost or damaged during transmission, and blocks 310, 312, 314, 316, 320, 322, 324, 326, 330, 332, 334, 336, 340, 342, 344, and 346 are the neighboring 4×4 blocks corresponding to the MB 300. The present invention makes use of the significantly strong correlation between the motion vectors of the spatially related neighboring blocks to predict the motion vector of the damaged MB 300. Specifically, first of all, the damaged MB 300 is divided into four 8×8 blocks (top-left block 300A, top-right block 300D, bottom-left block 300B, bottom-right block 300C) as illustrated in FIG. 3. The present invention provides an active regression (AR) plane based on the high correlation between each damaged 8×8 block and its surrounding six 4×4 blocks in order to predict the motion vector of each damaged 8×8 block. The AR plane can be a second-order plane calculated by utilizing the spatial corresponding motion vectors and the corresponding positions of the surrounding six 4×4 blocks.

Figure 4:
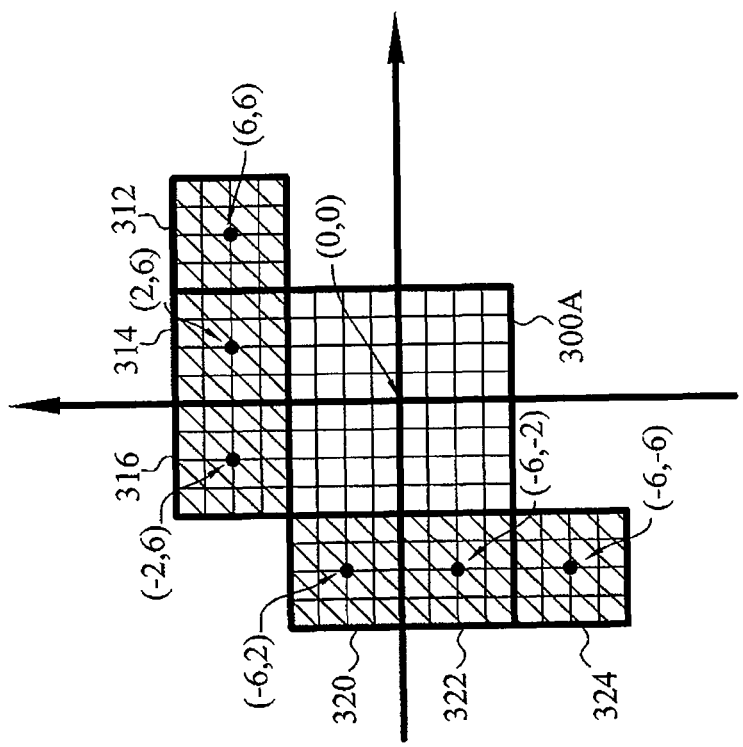
FIG. 4 shows the top-left 8×8 block within the macroblock in FIG. 3.
Figure 5:
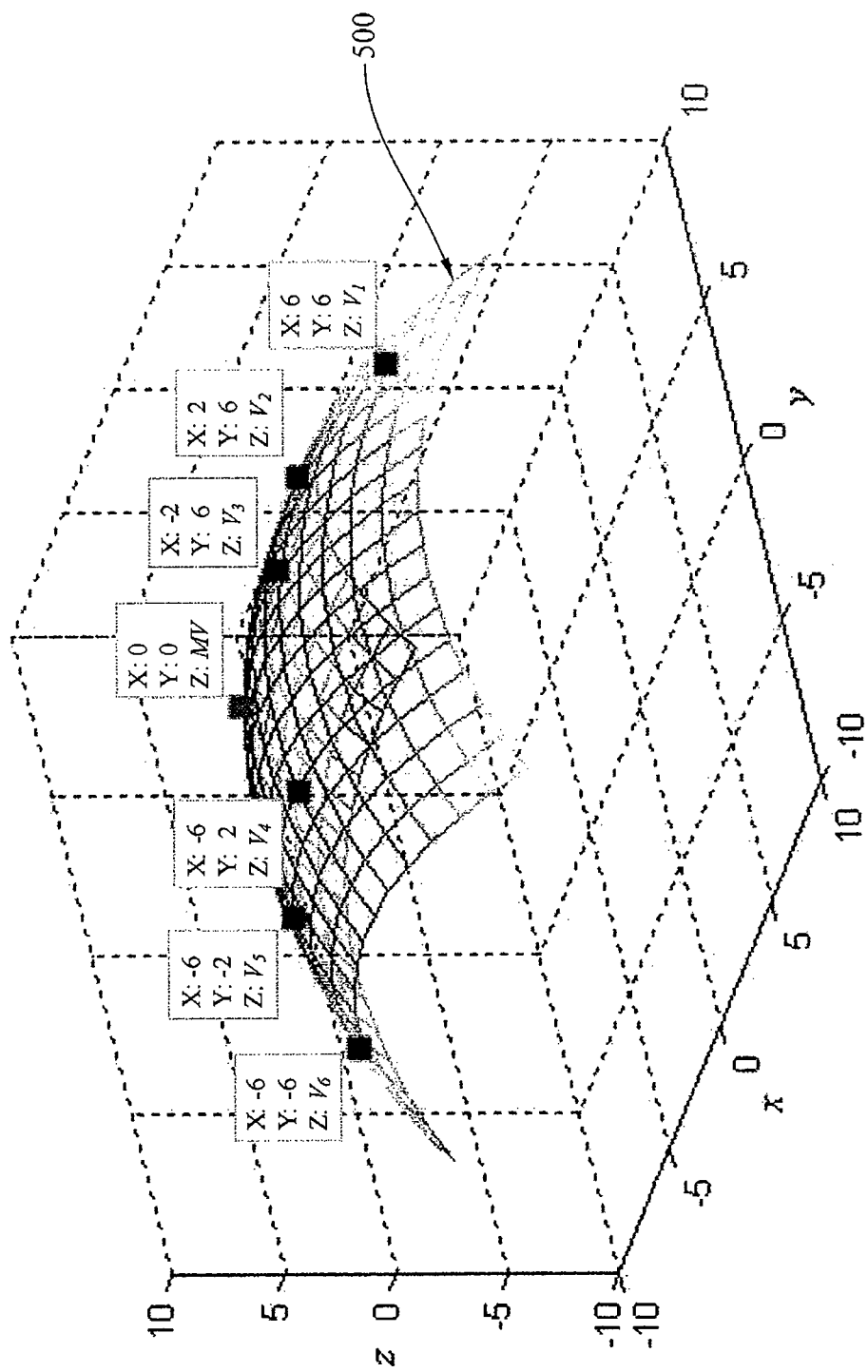
FIG. 5 shows an AR plane constructed based on the six neighboring 4×4 blocks according to one embodiment of the present invention.

Referring to FIG. 4, the top-left 8×8 block 300A shown in FIG. 3 is taken as an example to illustrate the method of predicting motion vector by using an AR place in accordance with one embodiment of the present invention. In this embodiment, the six 4×4 blocks 312, 314, 316, 320, 322, 324 with corresponding motion vectors V1, V2, V3, V4, V5, and V6 respectively are selected to estimate the motion vector of the 8×8 block 300A due to the reason that blocks spatially closest to each other are most likely to be highly correlative. The coordinate of the center of the block 300 is set as (0,0), and accordingly, the coordinates of the centers of the six neighboring 4×4 blocks are respectively (6,6), (2,6), (−2,6), (−6,2), (−6,−2), and (−6,−6). In order to give consideration to both the reduction of computation cost and the accurate description of nonlinear movement, the AR plane of the present invention is set as follows:

$$Z_i(x,y) = \alpha_1 x_i^2 + \alpha_2 x_i y_i + \alpha_3 y_i^2 + \alpha_4 x_i + \alpha_5 y_i + \alpha_6 \qquad 5$$

where x and y indicate coordinates of the centers of the six neighboring 4×4 blocks, and z is the corresponding motion vector. The coefficients ($\alpha 1$, $\alpha 2$, $\alpha 3$, $\alpha 4$, $\alpha 5$, $\alpha 6$) are calculated by using the coordinates of the centers of the six neighboring 4×4 blocks and the corresponding motion vectors (V1, V2, V3, V4, V5, V6). FIG. 5 shows an AR plane 500 constructed based on the six neighboring 4×4 blocks 312, 314, 316, 320, 322, 324 according to one embodiment of the present invention, and the motion vector of the damaged 8×8 block 300A will then be located on the AR plane 500. The motion vector of the damaged 8×8 block centered at (0, 0) can be expressed as follows:

where $$\Delta = \det(M), M = \begin{bmatrix} x_1^2 & x_1 y_1 & y_1^2 & x_1 & y_1 & 1 \\ x_2^2 & x_2 y_2 & y_2^2 & x_2 & y_2 & 1 \\ x_3^2 & x_3 y_3 & y_3^2 & x_3 & y_3 & 1 \\ x_4^2 & x_4 y_4 & y_4^2 & x_4 & y_4 & 1 \\ x_5^2 & x_5 y_5 & y_5^2 & x_5 & y_5 & 1 \end{bmatrix} + V_6 \frac{\Delta_6}{\Delta}$$

$$\Delta_1 = \det(M_1), M_1 = \begin{bmatrix} x^2 & xy & y^2 & x & y & 1 \\ x_2^2 & x_2 y_2 & y_2^2 & x_2 & y_2 & 1 \\ x_3^2 & x_3 y_3 & y_3^2 & x_3 & y_3 & 1 \\ x_4^2 & x_4 y_4 & y_4^2 & x_4 & y_4 & 1 \\ x_5^2 & x_5 y_5 & y_5^2 & x_5 & y_5 & 1 \\ x_6^2 & x_6 y_6 & y_6^2 & x_6 & y_6 & 1 \end{bmatrix}$$

$$\Delta_2 = \det(M_2), M_2 = \begin{bmatrix} x_1^2 & x_1 y_1 & y_1^2 & x_1 & y_1 & 1 \\ x^2 & xy & y^2 & x & y & 1 \\ x_3^2 & x_3 y_3 & y_3^2 & x_3 & y_3 & 1 \\ x_4^2 & x_4 y_4 & y_4^2 & x_4 & y_4 & 1 \\ x_5^2 & x_5 y_5 & y_5^2 & x_5 & y_5 & 1 \end{bmatrix}$$

$$\Delta_3 = \det(M_3), M_3 = \begin{bmatrix} x_1^2 & x_1 y_1 & y_1^2 & x_1 & y_1 & 1 \\ x_2^2 & x_2 y_2 & y_2^2 & x_2 & y_2 & 1 \\ x^2 & xy & y^2 & x & y & 1 \\ x_4^2 & x_4 y_4 & y_4^2 & x_4 & y_4 & 1 \\ x_5^2 & x_5 y_5 & y_5^2 & x_5 & y_5 & 1 \end{bmatrix}$$

$$\Delta_4 = \det(M_4), M_4 = \begin{bmatrix} x_1^2 & x_1 y_1 & y_1^2 & x_1 & y_1 & 1 \\ x_2^2 & x_2 y_2 & y_2^2 & x_2 & y_2 & 1 \\ x_3^2 & x_3 y_3 & y_3^2 & x_3 & y_3 & 1 \\ x^2 & xy & y^2 & x & y & 1 \\ x_5^2 & x_5 y_5 & y_5^2 & x_5 & y_5 & 1 \end{bmatrix}$$

-continued $$\Delta_5 = \det(M_5), M_5 = \begin{bmatrix} x_1^2 & x_1 y_1 & y_1^2 & x_1 & y_1 & 1 \\ x_2^2 & x_2 y_2 & y_2^2 & x_2 & y_2 & 1 \\ x_3^2 & x_3 y_3 & y_3^2 & x_3 & y_3 & 1 \\ x_4^2 & x_4 y_4 & y_4^2 & x_4 & y_4 & 1 \end{bmatrix}$$

$$\Delta_6 = \det(M_6), M_6 = \begin{bmatrix} x_1^2 & x_1 y_1 & y_1^2 & x_1 & y_1 & 1 \\ x_2^2 & x_2 y_2 & y_2^2 & x_2 & y_2 & 1 \\ x_3^2 & x_3 y_3 & y_3^2 & x_3 & y_3 & 1 \\ x_4^2 & x_4 y_4 & y_4^2 & x_4 & y_4 & 1 \\ x_5^2 & x_5 y_5 & y_5^2 & x_5 & y_5 & 1 \\ x^2 & xy & y^2 & x & y & 1 \end{bmatrix}$$

It should be noted that if the motion vectors of the corresponding neighboring blocks are not available, other motion vectors that are close to the damaged macroblock can be selected to estimate the motion vector of the damaged macroblock. Otherwise, the second-order AR plane may be converted into the first-order plane.

Figure 6:
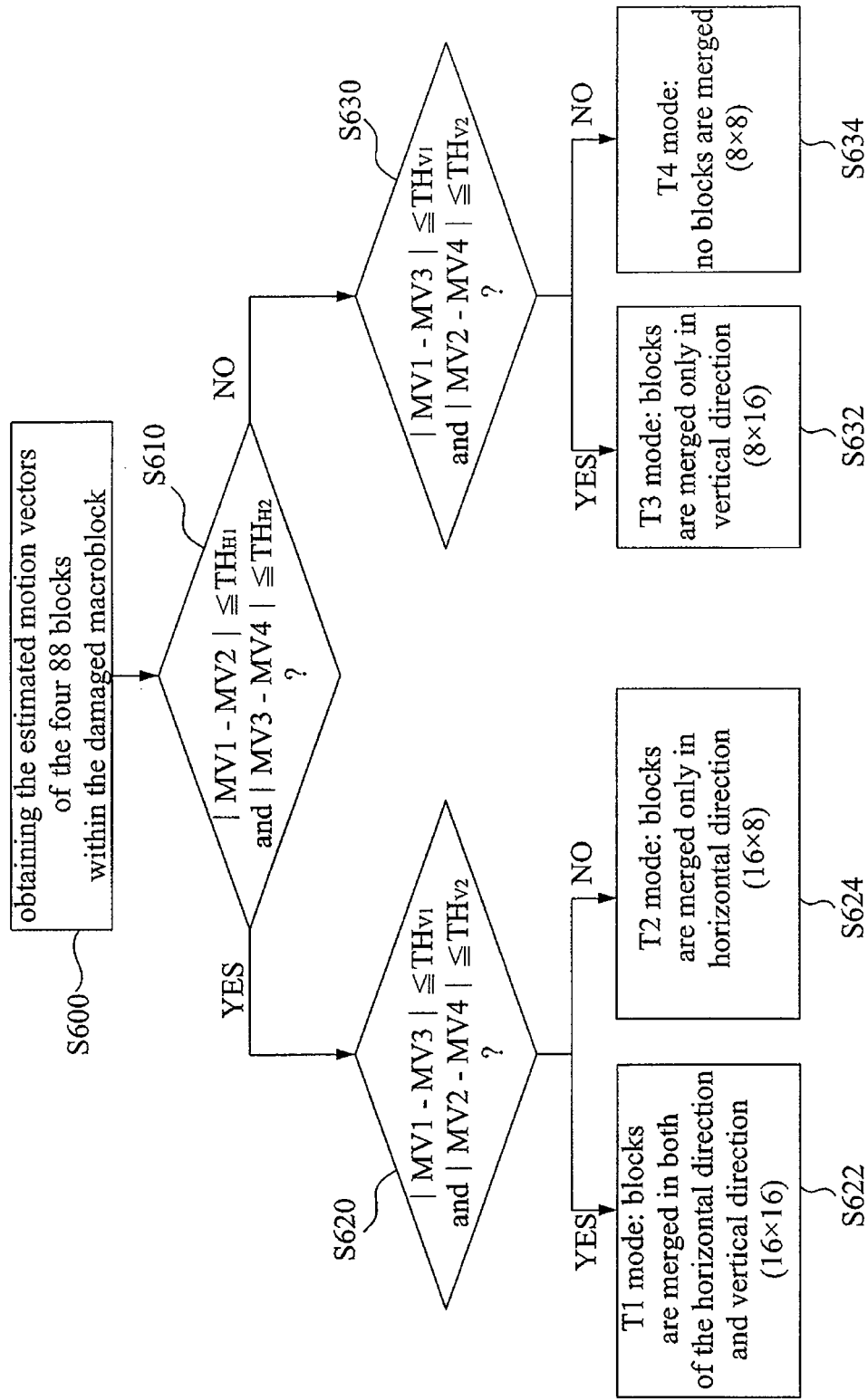
FIG. 6 is a flowchart shows a method for determining the variable block size mode in accordance with one embodiment of the present invention.

After estimating the motion vectors of each of the four 8×8 blocks 300A, 300B, 300C, and 300D within the damaged macroblock 300, one of the T1 mode (16×16), T2 mode (16×8), T3 mode (8×16), and T4 mode (8×8), which are variable block-size motion modes defined in H.264 standard is selected to perform the motion refinement based on these four estimated motion vectors. FIG. 6 is a flowchart that shows a method for determining the variable block size mode in accordance with one embodiment of the present invention, which prioritizes the merge method in horizontal directions over vertical directions to reduce the complexity of merging combinations. The damaged macroblock 300 in FIG. 3 is taken as an example for explanation. First, in step S600, the estimated motion vectors of the four 8×8 blocks 300A, 300B, 300C, and 300D within the macroblock 300 are obtained by the above-described approaches. Next, in step S610, the motion vectors of any two horizontally neighboring 8×8 blocks are compared with each other to determine if the following conditions can be met:

$$|MV1-MV2| \leq TH_{H1} \text{ and } |MV3-MV4| \leq TH_{H2};$$

where MV1, MV2, MV3 and MV4 denote the estimated motion vectors of the top-left 8×8 block, top-right 8×8 block, bottom-left 8×8 block and bottom-right 8×8 block (i.e. the blocks 300A, 300D, 300B, and 300C in FIG. 3), respectively. $TH_{H1}$ and $TH_{H2}$ are threshold values of the motion vector differences of any two horizontally neighboring 8×8 blocks and can be adjusted to suit various applications. In one embodiment, $TH_{H1}$ and $TH_{H2}$ can be experimentally set to 1. If both of the above conditions are met, the corresponding blocks are merged in the horizontal direction, and the procedure proceeds to step S620. On the other hand, if the above conditions are not both met, there is no block-merging in the horizontal direction, and the procedure proceeds to step S630. In other words, the neighboring 8×8 blocks may be merged into the larger block size in the horizontal direction according to the corresponding blocks that have similar motion vectors. Next, in both of step S620 and step S630, the motion vectors of any two vertically neighboring 8×8 blocks are compared with each other to determine if the following conditions can be met:

$$|MV1-MV3| \leq TH_{V1} \text{ and } |MV2-MV4| \leq TH_{V2};$$

Figure 7:
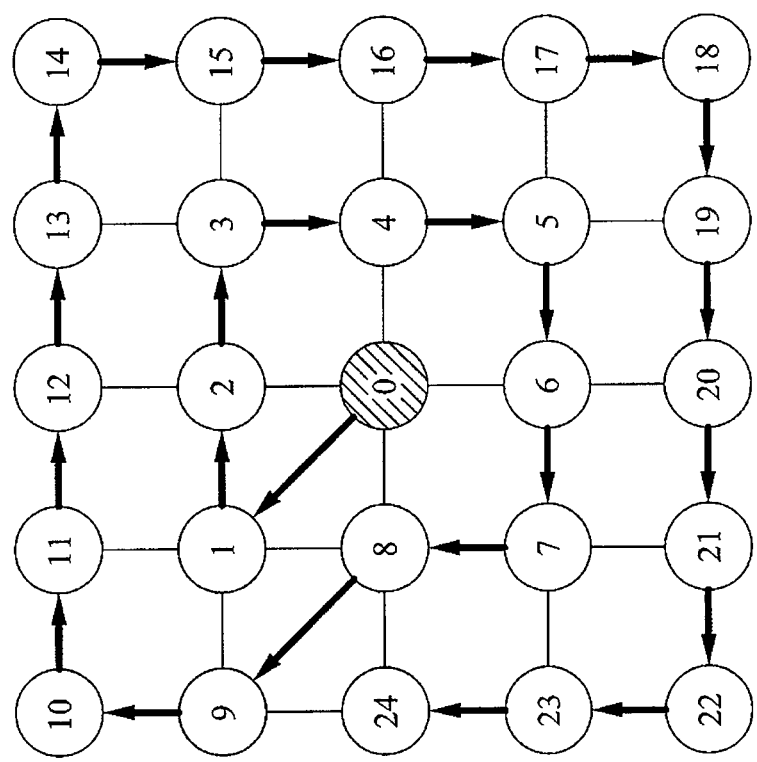
FIG. 7 is a diagram illustrating the comparison order according to one embodiment of the present invention.

$TH_{V1}$ and $TH_{V2}$ are threshold values of the motion vector differences of any two vertically neighboring blocks and, in one embodiment, both can be set to 1. If the step S620 determines that the conditions are met, the procedure proceeds to step S622 to merge four 8×8 blocks into a 16×16 macroblock to adopt T1 mode. On the other hand, if the step S620 determines that the conditions are not both met, the procedure proceeds to step S624 to adopt T2 mode, i.e. two 16×8 sub-macroblocks. In addition, if the step S630 determines that the conditions are met, the procedure proceeds to step S632 to merge the corresponding blocks in the vertical direction and thereby form two 8×16 sub-macroblocks based on T3 mode. In addition, if the step S630 determines that the conditions are not both met, the procedure proceeds to step S634 to adopt T4 mode without merging any 8×8 blocks. Typically, if the damaged macroblock is thought to exhibit low or regular motion, the larger block size is more suitable for motion refinement. On the other hand, if the damaged macroblock is thought to exhibit higher and irregular motion, a smaller block size is more suitable for motion refinement After the partition mode (T1, T2, T3, or T4 mode) is decided, motion refinement is applied to each sub-macroblock partition (16×16 block, 8×16 block, 16×8 block, or 8×8 block) to find a more accurate replacement of the damaged pixels. The motion refinement is similar to the motion estimation procedure performed at encoder. For each sub-macroblock partition, the estimated motion vector (if the sub-macroblock includes more than two 8×8 blocks, the corresponding motion vector can be, for example, the median or average of the motion vectors of the 8×8 blocks within this sub-macroblock) is used as a starting point for a motion estimation process that looks for a more accurate motion replacement, for which an external boundary matching error is employed as the matching measure. FIG. 7 is a diagram illustrating the comparison order according to one embodiment of the present invention. The estimated motion vector is used as a starting point (i.e. point 0 in FIG. 7) for searching a best-matched motion vector which is performed along an outward spiral scanning path within an adaptive search window of the reference frame.

The present invention provides a partial distortion comparison method and two early termination techniques to reduce computational complexity of the motion refinement process. The first early termination of the motion search, which is based on the original residual values of the corresponding boundary blocks, is to set a threshold as: $DT_a = \mu \times N + \gamma$, where N is the total number of pixels in the corresponding boundary blocks, $\mu$ is the average residual value of each corresponding pixel and $\gamma$ is the constant factor. The second early termination of the motion search process technique, which is based on the comparison results of the previous damaged blocks in the current frame, is to set another threshold as:

$$DT_b = EBME(u,v) \times EBME_\beta / EBME_\alpha \times \lambda + \epsilon,$$

where EBME(u, v) represents the current first adjacent external boundary matching error at the starting point, (u, v) represents the corresponding motion vector for the macroblock partition, $EBME_\alpha$ and $EBME_\beta$ denote the first adjacent external boundary matching error at the starting point and the minimum adjacent external boundary matching error of the previous damaged blocks in the current frame respectively, $\lambda$ (can be set as, for example, 0.6) is a constant scale factor, and $\epsilon$ (can be set as, for example, 0) is a constant factor. If the external boundary matching error of the corresponding surrounding blocks is less or equal than the dynamic threshold of either $DT_a$ or $DT_b$, which means the matching block is found, the search for the damaged sub-macroblock can be terminated. Hence the rest of the external boundary matching computation is avoided. Furthermore, the partial distortion comparison method of the present invention takes 16 pixels (4×4) as a comparison unit to reduce the huge external boundary matching computational complexity of the sum of absolute differences (SADs).

Figure 8:
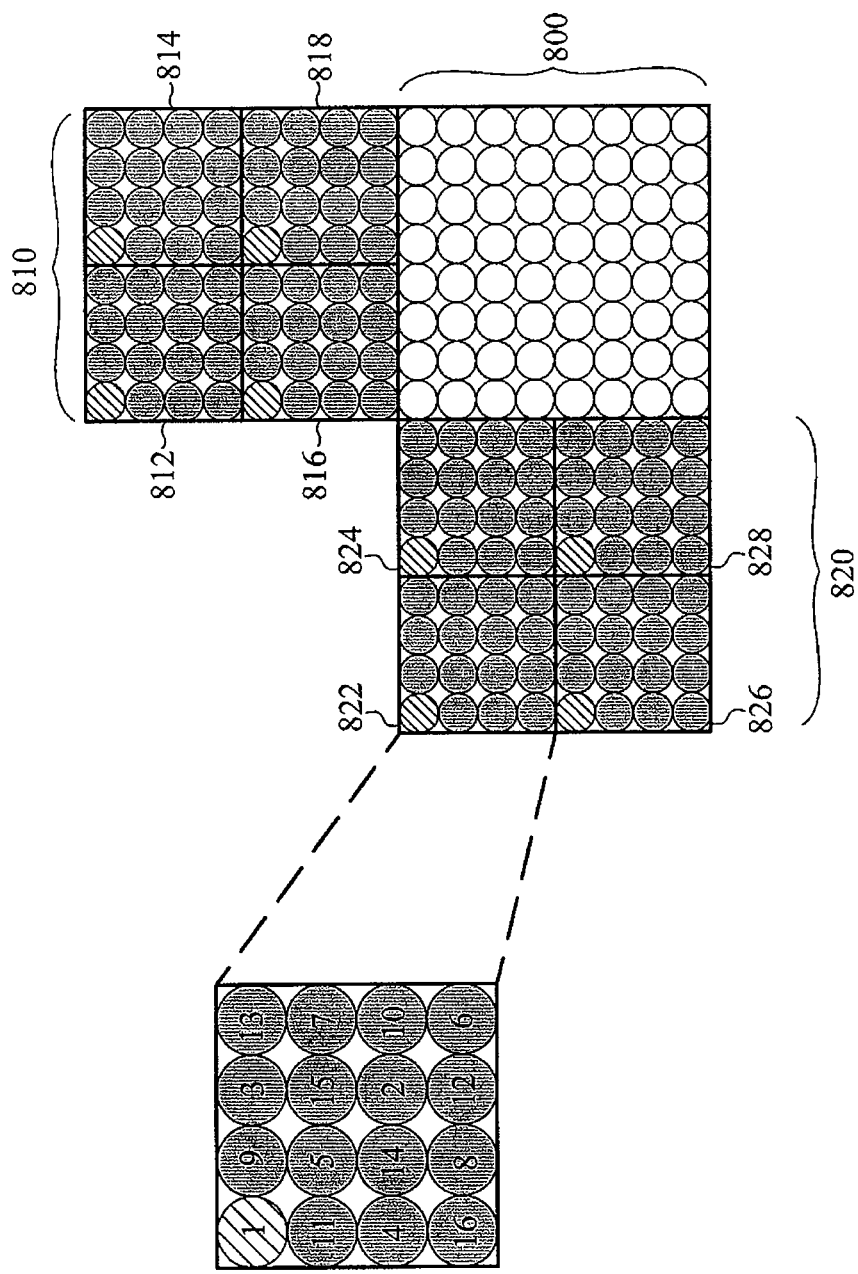
FIGS. 8 and 9 are an illustrative diagram and a flowchart respectively showing a refinement procedure under T4 (8×8 block) mode in accordance with one embodiment of the present invention.
Figure 9:
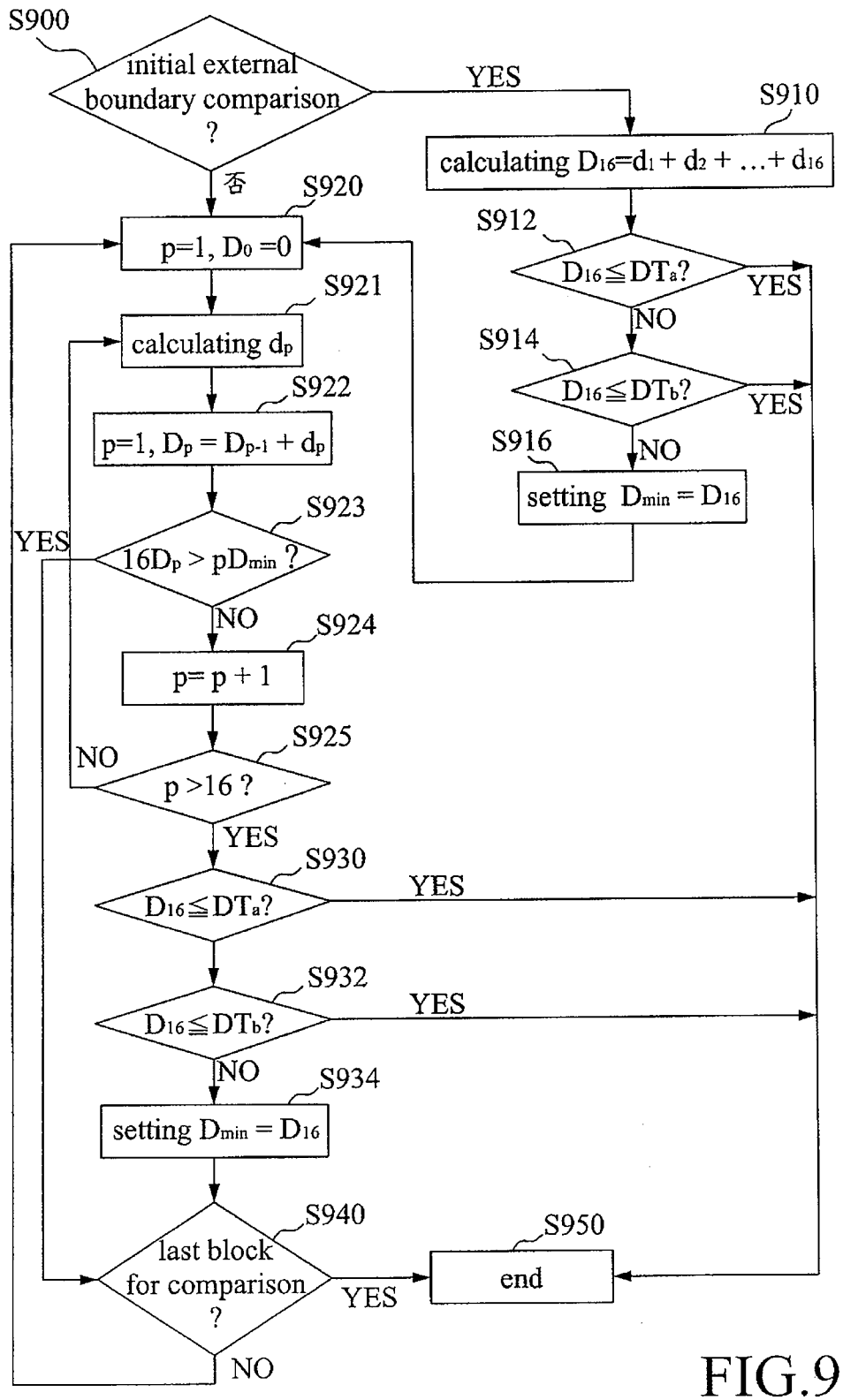

FIGS. 8 and 9 are illustrative diagram and flowchart respectively showing a refinement procedure under T4 (8×8 block) mode in accordance with one embodiment of the present invention. The block 800 is a top-left 8×8 block of a damaged macroblock, and its adjacent external boundary pixels (i.e. pixels of blocks 810 and 820) are directly above and towards the left. Typically, the SAD value of the block 800 is as follows:

$$D = \sum_{i=0}^{8} \sum_{j=0}^{8} |A_{Top}(x_0 + i, y_0 + j), -R(x_0 + i + u, y_0 + j + v)| + \sum_{i=0}^{8} \sum_{j=0}^{8} |A_{Left}(x_0 + i, y_0 + j), -R(x_0 + i + u, y_0 + j + v)|$$

where $A_{Top}$ and $A_{Left}$ represent the pixels of the current frame, R(x, y) represents the corresponding pixels of the reference frame, $(x_0, y_0)$ is the coordinate of the top left pixel of the corresponding block, and (u, v) is the corresponding motion vector.

Referring to FIG. 8, the partial distortion comparison method of the present invention takes a 4×4 block as a unit and thereby partitions each of the surrounding adjacent blocks 810 and 820 into four 4×4 blocks 812, 814, 816, 818, 822, 824, 826, and 828. The total distortion D of the blocks 810 and 820 is divided into 16 partial distortions ($d_p$, p=1~16), wherein each partial distortion ($d_p$) includes eight pixels located at the same relative locations within the 4×4 blocks 812, 814, 816, 818, 822, 824, 826, and 828 respectively. For example, the partial distortion $d_1$ includes eight pixels in the oblique-line area in FIG. 8. In one embodiment, the comparison order of the 16 partial distortions, $d_1$ to $d_{16}$, within each 4×4 block is shown in FIG. 8 (the enlarged view of the block 822), and each partial distortion $d_p$ can be defined as follows:

$$d_p = \sum_{i=0}^{1} \sum_{j=0}^{1} |A_{Top}(x_0 + 4i + s_p, y_0 + 4j + t_p), -R(x_0 + 4i + s_p + u, y_0 + 4j + t_p + v)| + \sum_{i=0}^{1} \sum_{j=0}^{1} |A_{Left}(x_0 + 4i + s_p, y_0 + 4j + t_p), -R(x_0 + 4i + s_p + u, y_0 + 4j + t_p + v)|$$

The ($s_p$, $t_p$) values corresponding to different p values are listed as follows:

| p | ($s_p$, $t_p$) |
|---|---|
| 1 | (0, 0) |
| 2 | (2, 2) |
| 3 | (2, 0) |
| 4 | (0, 2) |
| 5 | (1, 1) |

| p | $(s_p, t_p)$ |
|---|---|
| 6 | (3, 3) |
| 7 | (3, 1) |
| 8 | (1, 3) |
| 9 | (1, 0) |
| 10 | (3, 2) |
| 11 | (0, 1) |
| 12 | (2, 3) |
| 13 | (3, 0) |
| 14 | (1, 2) |
| 15 | (2, 1) |
| 16 | (0, 3) |

Further, the p-th accumulated partial distortion $D_p$ is defined as the value accumulated from $d_1$ up to p-th partial distortion and expressed as follows:
Based on $$D_p = \sum_{i=1}^{p} d_i$$

the above-mentioned description, the following will illustrate the motion refinement process performed for a damaged block according to one embodiment of the present invention. Referring to FIG. 9, in step S900, it is determined whether this comparison is the first external boundary match for the damaged block. If yes, the procedure proceeds to step S910 to calculate all the partial distortion $d_1$-$d_{16}$ and total distortion $D_{16}$=$d_1$+$d_2$+ ... +$d_{16}$. Next, in step S912 and step S914, it is determined whether $D_{16}$ is smaller than or equal to $DT_a$ and $DT_b$ (i.e. whether the condition of early termination technique can be met). If so, the procedure proceeds to S950 to terminate the motion refinement process of this damaged block. If the determinations in step S912 and step S914 are both negative, the procedure proceeds to step S916 to compare with next candidate block, while the total distortion value $D_{16}$ calculated in step S910 is set as a new reference value, $D_{min}$, for the next candidate block. Next, during step S920 to step S925, the following external boundary match starts from p=1 to calculate $d_p$ (8 pixels) and $D_p$, and the comparison with this candidate block is stopped as long as $D_p$>p×$D_{min}$/16 and then the procedure proceeds to S940. In other words, the order of the comparison starts from p=1 to p=16, and after calculating $d_1$ and $D_1$, if $D_1$<$D_{min}$/16, the above step is repeated to calculate $d_2$ and $D_2$ and compare $D_2$ with 2×$D_{min}$/16, and so on and so forth. The comparison is stopped if the current accumulated partial distortion ($D_p$) is greater than the normalized minimum distortion (p$D_{min}$/16), which means the current external boundary match of the motion vector cannot be a candidate. At the end of the comparison (p=16), if D16 is smaller than $D_{min}$, then the procedure proceeds to step S930 and step S932 respectively to determine whether $D_{16}$ is smaller than or equal to $DT_a$ and $DT_b$ (i.e. whether the condition of early termination technique can be met). If so, the procedure proceeds to S950 to terminate the motion search of this damaged block. If the determinations in step S930 and step S932 are both negative, the procedure proceeds to step S934 to set this $D_{16}$ as a new reference value $D_{min}$, i.e. this current motion vector is regarded as the new current minimum point. Next, the procedure proceeds to step S940 to determine whether the comparison has been performed for all of the candidate blocks in the search window. If it does, the procedure ends at step S950. Otherwise, the procedure returns to step S920 to continue the external boundary match for the next candidate block. Theoretically, the 16-pixel sub-sampling pattern with the early termination technique limits the maximum possible speedup to 16 times.

The temporal error concealment method of the present invention includes the active regression plane developed for the repair of corrupted motion vectors, the creation of a framework to perform the variable block size motion compensation based on predictive motion vectors, and the use of motion refinement with the efficient early termination techniques for H.264 decoder. In the present invention, the impaired motion vectors are reconstructed based on the active regression plane, and a significant speed-up on motion refinement is achieved with variable block size motion compensation, an adaptive search range, the use of a 16-pixel sub-sampling pattern with an early termination technique, and dual early termination techniques by dynamic thresholds.

While this invention has been described with reference to the illustrative embodiments, these descriptions should not be construed in a limiting sense. Various modifications of the illustrative embodiment, as well as other embodiments of the invention, will be apparent upon reference to these descriptions. It is therefore contemplated that the appended claims will cover any such modifications or embodiments as falling within the true scope of the invention and its legal equivalents.

We claim:

1. A method for performing temporal error concealment, comprising:
   (a) detecting a damaged macroblock comprised of four 8×8 damaged blocks;
   (b) obtaining motion vectors of a plurality of 4×4 neighboring blocks surrounding the damaged macroblock;
   (c) for each of the 8×8 damaged blocks, determining a predicted motion vector according to motion vectors of six of the plurality of 4×4 neighboring blocks which are closest to the 8×8 damaged block; and
   (d) comparing the predicted motion vectors of the four 8×8 damaged block, thereby, based on the comparison result, merging the four 8×8 damaged block into two 16×8 damaged blocks, merging the four 8×8 damaged block into two 8×16 damaged blocks, merging the four 8×8 damaged block into one 16×16 damaged block, or not merging the four 8×8 damaged blocks;
   wherein the comparing step comprises comparing the predicted motion vectors of any two horizontally neighboring 8×8 damaged blocks with each other and comparing the predicted motion vectors of any two vertically neighboring 8×8 damaged blocks with each other, and
   wherein merging of the four 8×8 block in a horizontal direction is prioritized over merging of the four 8×8 block in a vertical direction.

2. The method according to claim 1, wherein the step (c) further comprises:
   setting an active regression plane as Zi(x, y)=α1xi2+α2xi yi+α3yi2+α4xi+α5yi+α6; and
   calculating coefficients α1, α2, α3, α4, α5, α6 by substituting coordinates of centers and the motion vectors of the six 4×4 neighboring blocks for xi, yi, and Zi of the active regression plane;
   wherein the predicted motion vector is determined to be on the active regression plane.

3. The method according to claim 2, further comprising:
   (e) for each of the 8×8 damaged blocks, using the predicted motion vector of the 8×8 damaged block as a starting point to perform pixel comparison between the 8×8 damaged block and reference blocks in a search window of a reference frame to obtain a best-match reference block in the search window.

4. The method according to claim 1, further comprising:
(f) for each of the merged 16×8 damaged blocks, the merged 8×16 damaged blocks, and the merged 16×16 damaged block, determining a predicted motion vector is an average of the motion vectors of the 8×8 blocks within the merged damaged block; and
(g) for each of the 8×8 damaged blocks, the merged 16×8 damaged blocks, the merged 8×16 damaged blocks, and the merged 16×16 damaged block, using the predicted motion vector thereof as a starting point to perform pixel comparison to obtain a best-match reference block in a search window of a reference frame.

5. The method according to claim 3, wherein the pixel comparison is to calculate difference between external boundary pixels of the damaged block and external boundary pixels of the reference blocks in the search window.

6. The method according to claim 5, wherein the difference a function of a SAD (sum of absolute difference) value.

7. The method according to claim 5, wherein the step (e) is performed along a spiral path.

8. The method according to claim 7, wherein in the step (e), when a difference between the 8×8 damaged block and a specific reference block is smaller than a predetermined threshold value, the step (e) is terminated and the specific reference block is determined as the best-match reference block, wherein the predetermined threshold value is $DTa=\mu \times N+\gamma$, where N is total number of external boundary pixels of the 8×8 damaged block, $\mu$ is an average of residual values of external boundary pixels, and $\gamma$ is the constant factor.

9. The method according to claim 7, wherein in the step (e), when a difference between the 8×8 damaged block and a specific reference block is smaller than a predetermined threshold value, the step (e) is terminated and the specific reference block is determined as the best-match reference block, wherein the predetermined threshold value is $DTb=EBME(u, v) \times EBME\beta/EBME\alpha \times \lambda + \epsilon$, where EBME (u, v) represents current first adjacent external boundary matching error at the starting point, (u, v) represents the motion vector for the 8×8 damaged block, $ERME\alpha$ and $EBME\beta$ denote first adjacent external boundary matching error at the starting point and minimum adjacent external boundary matching error of previous damaged blocks in a current frame respectively, $\lambda$ is a constant scale factor, and $\epsilon$ is a constant factor.

10. The method according to claim 3, wherein the pixel comparison of each of the 8×8 damaged blocks further comprises the following steps:
calculating an initial difference value between external boundary pixels of a first reference block and external boundary pixels of the 8×8 damaged block at the starting point and setting the initial difference value as Dmim;
selecting a second reference block along the spiral path;
dividing the external boundary pixels of the 8×8 damaged block into 16 parts;
defining a p-th partial distortion as an external boundary match error of a p-th part of the 16 parts, wherein p is an integer between 1 and 16;
defining a p-th accumulated partial distortion Dp as a value accumulated from first partial distortion up to p-th partial distortion; and
performing pixel comparison between the second reference block and the 8×8 damaged block from p=1 to calculate the p-th accumulated partial distortion and compare the p-th accumulated partial distortion with p×Dmim/16, wherein the pixel comparison with the second reference block is stopped as long as Dp>p×Dmim/16.

11. A non-transitory computer readable medium having a program code stored thereon, wherein when the program code is executed by a video decoding system, the program code causes the video decoding system to implement a method for performing temporal error concealment, comprising:
(a) detecting a damaged macroblock comprised of four 8×8 damaged blocks;
(b) obtaining motion vectors of a plurality of 4×4 neighboring blocks surrounding the damaged macroblock;
(c) for each of the 8×8 damaged blocks, determining a predicted motion vector according to motion vectors of six of the plurality of 4×4 neighboring blocks which are closest to the 8×8 damaged block; and
(d) comparing the predicted motion vectors of the four 8×8 damaged block, thereby, based on the comparison result, merging the four 8×8 damaged block into two 16×8 damaged blocks, merging the four 8×8 damaged block into two 8×16 damaged blocks, merging the four 8×8 damaged block into one 16×16 damaged block, or not merging the four 8×8 damaged blocks;
wherein the comparing step comprises comparing the predicted motion vectors of any two horizontally neighboring 8×8 damaged blocks with each other and comparing the predicted motion vectors of any two vertically neighboring 8×8 damaged blocks with each other, and
wherein merging of the four 8×8 block in a horizontal direction is prioritized over merging of the four 8×8 block in a vertical direction.

12. A method for performing temporal error concealment, comprising:
(a) detecting a damaged macroblock comprised of four 8×8 damaged blocks;
(g) obtaining motion vectors of a plurality of 4×4 neighboring Hocks surrounding the damaged macroblock;
(c) for each of the 8×8 damaged blocks, determining a predicted motion vector according to motion vectors of six of the plurality of 4×4 neighboring blocks which are closest to the 8×8 damaged block, comprising setting an active regression plane as $Zi(x, y)=\alpha1 xi2+\alpha2 xi yi+\alpha3 yi2+\alpha4 xi+\alpha5 yi+\alpha6$ and calculating coefficients $\alpha1, \alpha2, \alpha3, \alpha4, \alpha5, \alpha6$ by substituting coordinates of centers and the motion vectors of the six 4×4 neighboring blocks for xi, yi, and Zi of the active regression plane, wherein the predicted motion vector is determined to be on the active regression plane;
(d) comparing the predicted motion vectors of the four 8×8 damaged block, thereby, based on the comparison result, merging the four 8×8 damaged block into two 16×8 damaged blocks, merging the four 8×8 damaged block into two 8×16 damaged blocks, merging the four 8×8 damaged block into one 16×6 damaged block, or not merging the four 8×8 damaged blocks; and
(e) for each of the 8×8 damaged blocks, using the predicted motion vector of the 8×8 damaged block as a starting point to perform pixel comparison between the 8×8 damaged block and reference blocks in a search window of a reference frame to obtain a best-match reference block in the search window;
wherein the comparing step comprises comparing the predicted motion vectors of any two horizontally neighboring 8×8 damaged blocks with each other and comparing the predicted motion vectors of any two vertically neighboring 8×8 damaged blocks with each other, wherein the pixel comparison is to calculate difference between external boundary pixels of the damaged block and external boundary pixels of the reference blocks in the search window, wherein the step (e) is performed along a spiral path, and wherein in the step (e), when a difference between the 8×8 damaged block and a specific reference block is smaller than a predetermined threshold value, the step (e) is terminated and the specific reference block is determined as the best-match reference block, wherein the predetermined threshold value is DTb=EBME(u, v)×EBMEβ/EBMEα×λ+ϵ, where EBME(u, v) represents current first adjacent external boundary matching error at the starting point, (u, v) represents the motion vector for the 8×8 damaged block, EBMEα and EBMEβ denote first adjacent external boundary matching error at the starting point and minimum adjacent external boundary matching error of previous damaged blocks in a current frame respectively, λ is a constant scale factor, and ϵ is a constant factor.

13. A method for performing temporal error concealment, comprising:
(a) detecting a damaged macroblock comprised of four 8×8 damaged blocks;
(b) obtaining motion vectors of a plurality of 4×4 neighboring blocks surrounding the damaged macroblock;
(c) for each of the 8×8 damaged blocks, determining a predicted motion vector according to motion vectors of six of the plurality of 4×4 neighboring blocks which are closest to the 8×8 damaged block, comprising setting an active regression plane as Zi(x, y)=α1xi2+α2xi yi+α3yi2+α4xi+αyi+α6 and calculating coefficients α1, α2, α3, α4, α5, α6 by substituting coordinates of centers and the motion vectors of the six 4×4 neighboring blocks for xi, yi, and Zi of the active regression plane, wherein the predicted motion vector is determined to be on the active regression plane;
(d) comparing the predicted motion vectors of the four 8×8 damaged block, thereby, based on the comparison result, merging the four 8×8 damaged block into two 16×8 damaged blocks, merging the four 8×8 damaged block into two 8×16 damaged blocks, merging the four 8×8 damaged block into one 16×16 damaged block, or not merging the four 8×8 damaged blocks; and
(e) for each of the 8×8 damaged blocks, using the predicted motion vector of the 8×8 damaged block as a starting point to perform pixel comparison between the 8×8 damaged block and reference blocks in a search window of a reference frame to obtain a best-match reference block in the search window;

wherein the comparing step comprises comparing the predicted motion vectors of any two horizontally neighboring 8×8 damaged blocks with each other and comparing the predicted motion vectors of any two vertically neighboring 8×8 damaged blocks with each other, wherein the pixel comparison of each of the 8×8 damaged blocks further comprises the following steps:
calculating an initial difference value between external boundary pixels of a first reference block and external boundary pixels of the 8×8 damaged block at the starting point and setting the initial difference value as Dmim;
selecting a second reference block along the spiral path;
dividing the external boundary pixels of the 8×8 damaged block into 16 parts;
defining a p-th partial distortion as an external boundary match error of a p-th part of the 16 parts, wherein p is an integer between 1 and 16;
defining a p-th accumulated partial distortion Dp as a value accumulated from first partial distortion up to p-th partial distortion; and
performing pixel comparison between the second reference block and the 8×8 damaged block from p=1 to calculate the p-th accumulated partial distortion and compare the p-th accumulated partial distortion with p×Dmim/16, wherein the pixel comparison with the second reference block is stopped as long as Dp>p× Dmim/16.

* * * * *